United States Patent
Zäh et al.

(10) Patent No.: US 7,671,110 B2
(45) Date of Patent: Mar. 2, 2010

(54) METHOD FOR UNIFORMLY DISTRIBUTING A SUBSTANCE IN A SUBSTRATE

(75) Inventors: Matthias Zäh, Gersthofen (DE); Alexander Lichtblau, Augsburg (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 1080 days.

(21) Appl. No.: 10/522,564

(22) PCT Filed: Jul. 17, 2003

(86) PCT No.: PCT/IB03/03446

§ 371 (c)(1), (2), (4) Date: Oct. 25, 2005

(87) PCT Pub. No.: WO2004/009682

PCT Pub. Date: Jan. 29, 2004

(65) Prior Publication Data

US 2006/0110589 A1    May 25, 2006

(30) Foreign Application Priority Data

Jul. 19, 2002  (DE) .............................. 102 33 078

(51) Int. Cl.
*C08K 7/00* (2006.01)
(52) U.S. Cl. .................................................. 523/220
(58) Field of Classification Search ............... 523/220
See application file for complete search history.

(56) References Cited

FOREIGN PATENT DOCUMENTS

| EP | 0455092 | 11/1991 |
|---|---|---|
| WO | WO 0241325 | 5/2002 |

OTHER PUBLICATIONS

PCT Search Report for PCT/IB 03/03446, Nov. 4, 2003.
PCT IPER for PCT/IB 03/03446, Oct. 4, 2004.

*Primary Examiner*—Edward J Cain
(74) *Attorney, Agent, or Firm*—Anthony A. Bisulca

(57) ABSTRACT

The invention relates to a new method for improved distribution of a substance or mixture of substances in a carrier or substrate or in a mixture of different carriers or substrates. The invention likewise relates to the raw, multicomponent compositions, semi-finished products or end articles obtained by this method and also to the micropowders of the substance or mixture of substances that are used in the method. The invention relates in particular to the application of this method to the incorporation of additives into plastics and to the plastics additives micropowders prepared for that purpose.

14 Claims, No Drawings

METHOD FOR UNIFORMLY DISTRIBUTING A SUBSTANCE IN A SUBSTRATE

The invention relates to a new method for improved distribution of a substance or mixture of substances in a carrier or substrate or in a mixture of different carriers or substrates. The invention likewise relates to the raw, multicomponent compositions, semi-finished products or end articles obtained by this method and also to the micropowders of the substance or mixture of substances that are used in the method. The invention relates in particular to the application of this method to the incorporation of additives into plastics and to the plastics additives micropowders prepared for that purpose.

STATE OF THE ART

Numerous sectors of industry require the uniform distribution of small amounts of one or more substances in a carrier. In many cases these substances are of decisive importance for the production of the respective carrier or article produced therefrom, in order to obtain or maintain any desired function. The additives, used in small amount, can therefore not be abandoned without a loss of functional properties. In such applications it is common to use granules rather than powders, since, on the one hand, separation is avoided and, on the other hand, non-dusting forms are preferred. Accordingly, however, satisfactory uniform distributions are achieved only to a limited extent with customary shaped conversion operations. The homogeneous distribution which is in fact desired is forcibly brought about subsequently, if indeed it is achievable at all, by means of complicated engineering steps. For example, for improved distribution in plastics, additives and pigments are first processed to a masterbatch (concentrate of the additive or pigment in question in a similar or different plastic), and it is only in this form that they are introduced into the plastics.

The object of the invention, then, is to achieve a uniform distribution of a relatively small amount of a substance or mixture of substances in a carrier or substrate or in a mixture of different carriers or substrates without complicated engineering steps and to produce homogeneous, multicomponent raw compositions, semi-finished products or end articles by a technically simple and inexpensive method.

This object is achieved in that a substance or mixture of substances (referred to below as A) having a particle size <50 μm is applied uniformly to the surface of a carrier or substrate or of a mixture of different carriers or substrates (referred to below as B) having a particle size <5 mm and the mixture obtained is subjected to a shape conversion operation with pressure and/or temperature, the viscosity of the mixture during the operation being at least 50 mPas*s.

The fine pulverization of the substance A brings it to a size which allows uniform distribution on the surface of the substrate B. After the components have been mixed, the mixture obtained, comprising powders having different particle sizes, is converted by pressure and/or temperature into a viscous state (viscosity of at least 50 mPas*s) and is processed to corresponding raw compositions, semi-finished products or end articles. The specific selection of the geometric proportions produces, in comparison with the existing technique, a distribution which is either substantially more homogeneous in its entirety and results in correspondingly positive properties, or leads to the same subsequent properties with less effort.

The method of the invention has the effect that substances incorporated as active substances in a substrate develop a better activity as a result of the homogeneous distribution in the substrate, i.e. are effective in smaller amounts than hitherto, and that the effort required to achieve the homogeneous distribution is less than with conventional methods.

In comparison to the known technology for dispersing pigments into polymers by means of micronized waxes, the present invention comprises the better dispersion of micronized substances into coarsely particulate substrates, while the said technology consists in dispersing ultrafine particles and/or their agglomerates by means of micronized waxes (but with a coarser particle size than the pigments) into coarse substrates. In the known technology, therefore, the size ratio of auxiliary to "substrate" is the other way round and in each case three different particle sizes are processed with one another, while in the present invention—except when using mixtures differing in size—only two different particle sizes are combined.

In one preferred embodiment of the invention the substance A after the shape conversion operation is at least partly to fully dissolved in the substrate B.

One typical application of this new method is the incorporation of additives into plastics, where homogeneous distribution is an essential prerequisite for the activity of the additives. With the new method it is possible to achieve a substantially more homogeneous distribution of any desired additives in any desired plastics, so that substantially smaller amounts of these additives lead to a superior effect in the plastics in question.

Further applications of interest are the improved distribution of aggregates in sinter materials, or of additives in powder coating materials.

Substance A can be brought to the desired size range from coarser particles by means of known techniques, by means of energy input. The intention is to take the median value $D_{50}$ of the substance A, above and below which half of the larger and smaller particles are situated, respectively, as a measure of the size order, to <50 μm. The median of the particle size, referred to as $D_{50}$, represents the figure above and below which 50% of the larger and smaller particles lie. The underlying distribution function is arbitrary (examples and definitions of terms are given in DIN standard 66141) and ought to possess a $D_{90}$, understood as the figure below which 90% of the smaller particles are located, of 100 μm. This size order of A can also be obtained, however, by construction or by direct preparation or classification of suitable particles. The substance A preferably has a particle size <20 μm, more preferably still a particle size <10 μm.

The substance A will generally be present in a size ratio of <1:20, preferably of <1:50, more preferably of <1:100, to the substrate B, the substrate B preferably having a particle size <5 mm, more preferably <2 mm, very preferably <1 mm.

The application of the substance A to the surface of the substrate B (and its adhesion thereon) is brought about and maintained, depending on material, not only by forces of adhesion but also (in the case of nonconductive substances) by electrostatic charging during the mixing operation. Thus as a result of these attraction forces it is possible, for example, by simple contact of various materials with sufficiently small particles of A to be coated in a simple manner. The chosen small size of the particles of A means that the weight forces acting are small and that the kind of separation frequently observed with more coarsely particulate preparations is prevented.

Subsequently the mixture of A and B is subjected to a shape conversion operation with pressure and/or temperature, leading alternatively to a raw composition, to a semi-finished product or directly to a finished end article. In this case it is possible to employ any methods of shape conversion which brings the mixture into a viscous state with a viscosity of at least 50 mPas*s, preferably of at least 100 mPas*s, more preferably of at least 200 mPas*s, in particular of at least 500 mPas*s. Mention may be made in this context of extrusion, kneading, sintering, rotational melting, compression moulding, casting, and powder coating.

One preferred embodiment of the invention consists in incorporating additives for plastics into the plastics in the form of micropowders.

Additives for plastics are normally added as flakes, granules, powders, dispersions or emulsions, but not as micropowders, the preferred use form being selected only from the standpoint of ease of handling, with no difference having been found to date in the activity of the additives. A variety of commercial forms of plastics additives are known: from powder to granules, all forms are represented. For a variety of reasons (occupational hygiene, handling, production processes, mixing with polymer granules, etc.) the trend is increasingly away from powder towards coarser, dust-free commercial forms.

Additives, however, must be distributed effectively in the plastic and, preferably, dissolved, in order that they can develop their activity uniformly.

The processing of plastics takes place at temperatures well above the melting point of polymer and additive. In such processing, in the extruders, the melt of polymer and additives or further adjuvants is also intensively mixed by chemical means. The assumption was therefore that, as a result of these operations, the additives are sufficiently incorporated into the polymer and homogonously distributed therein, especially since in many cases more than just one processing step with the additive is carried out.

Although brochures from the additives manufacturers refer again and again to the appropriate incorporation of the additives, relevant specialist books do not deal with this topic at all (cf. Plastics Additives Handbook from the authors Gächter/Müller). The assumption was therefore that the activity/efficiency of the additives is independent of the commercial form.

Surprisingly, however, it has now been found that through the use of micropowders it is possible to achieve a marked increase in the activity of the additives. When micronized additives are employed the efficiency is much higher, so that alternatively adding the same amount, a marked increase in productivity can be obtained; or the same activity of the additive can be obtained with a smaller added amount; or the same activity can be achieved with simplified incorporation (lower machinery costs, etc.); or possibly, a simplified processing operation (fewer processing steps for effective incorporation of the additive) actually becomes possible.

It is surprising that the use of a micropowder improves the efficiency in this way despite the fact that incorporation takes place above the melting point of polymer and additive and simultaneously with the mechanical mixing/kneading in the processing machines, which ought to lead to effective incorporation.

One preferred subject of the invention is, accordingly, plastics additives and their mixtures in micronized form.

By micronized form (=micropowder) is meant a powder having a particle size <50 µm with a particle size distribution of $D_{90}$<100 µm and $D_{50}$<50 µm, a preferred particle size distribution being between $D_{90}$<50 µm and $D_{50}$<20 µm and, respectively, $D_{90}$<30 µm and $D_{50}$<15 µm.

A further subject of the invention is the production of such micronisates by appropriate methods and their use in plastics and rubbers. Preparation takes place by breaking down coarser particles with energy input, such as grinding of a relatively coarse form in mills such as mechanical mills or in an air jet mill (cf. Ullmann's Encyclopedia of Industrial Chemistry; 5th edition, vol. B2: unit operations I; chapter 5: Size Reduction) or by exposure to acoustics or ultrasound or by direct preparation or separation by means of crystallization or by spraying or other known methods or else by constructive methods from smaller particles. The micronisate can also be prepared by separation from a powder mixture (cf. Ullmann's Encyclopedia of Industrial Chemistry; 5th edition, vol. B2: unit operations I; chapter 14-23: Solid-Solid Separation).

The micropowders of the invention can be incorporated into polymer substrates conventionally; in view of the improved activity, however, other, simplified methods of incorporation are also conceivable. The additives serve to enhance the processing properties of the polymers or else to achieve the desired properties of the end article, as described in the Plastics Additives Handbook from the authors Gächter/Müller. Surely deserving of emphasis is the stabilization to light and heat of polyolefins such as polyethylene, polypropylene, etc., but also all other properties described in the abovementioned handbook.

One preferred subject of the invention is stabilizers from the class known as HALS. Others are antioxidants, in-process stabilizers, metal deactivators, costabilizers, etc.

Besides the additives which introduce, enable or obtain a desired property, it is possible to use auxiliaries in the fine powders to allow their industrial preparation, such as grinding assistants or release agents or driers, for example. The two latter auxiliaries are intended to prevent subsequent agglomeration.

Among polymeric materials, the following may be mentioned:

1. Polymers of monoolefins and diolefins, for example polypropylene, polyisobutylene, polybut-1-ene, poly-4-methylpent-1-ene, polyisoprene or polybutadiene, and also polymers of cycloolefins, for example of cyclopentene or norbornene; additionally polyethylene (which optionally can be crosslinked); for example, high density polyethylene (HDPE), low density polyethylene (LDPE), linear low density polyethylene (LLDPE), branched low density polyethylene (BLDPE). Polyolefins, i.e. polymers of monoolefins as exemplified in the preceding paragraph, in particular polyethylene and polypropylene, can be prepared by various, and especially by the following, methods:

a) free-radical polymerization (normally under high pressure and at elevated temperature)

b) catalytic polymerization using a catalyst that normally contains one or more metals of group IVb, Vb, VIb or VIII. These metals usually have one or more ligands, such as oxides, halides, alcoholates, esters, ethers, amines, alkyls, alkenyls and/or aryls that may be either π- or σ-coordinated. These metal complexes may be in free form or fixed on substrates, for example on activated magnesium chloride, titanium chloride, alumina or silica. These catalysts may be soluble or insoluble in the polymerization medium. The catalysts can be active as such in the polymerization or further activators may be used, for example metal alkyls, metal hydrides, metal alkyl halides, metal alkyl oxides or metal alkyloxanes, the metals being elements of groups Ia, IIa and/or IIIa of the Periodic Table. The activators may be modified, for example, with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene-propylene copolymers, linear low density polyethylene (LLDPE) and mixtures thereof with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide, or ethylene-acrylic acid copolymers and their salts (ionomers), and also terpolymers of ethylene with propylene and a diene such as hexadiene, dicyclopentadiene or ethylidene norbornene; and mixtures of such copolymers with one another and with polymers mentioned under 1), for example polypropylene/ethylenepropylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene-carbon monoxide copolymers and mixtures thereof with other polymers, for example polyamides.

4. Hydrocarbon resins (for example $C_5$-$C_9$) including hydrogenated modifications thereof (e.g. tackifier resins) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methyl acrylate; mixtures of high impact strength of styrene copolymers and another polymer, for example a polyacrylate, a diene polymer or an ethylene-propylene-diene terpolymer; and block copolymers of styrene, such as styrene-butadiene-styrene, styrene-isoprene-styrene, styrene-ethylene/butylene-styrene or styrene-ethylene/propylene-styrene.

7. Graft copolymers of styrene or $\alpha$-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for example the copolymer mixtures known as ABS, MBS, ASA or AES polymers.

8. Halogen-containing polymers, such as polychloroprene, chlorinated rubber, chlorinated or sulphochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.

9. Polymers derived from $\alpha,\beta$-unsaturated acids and derivatives thereof, such as polyacrylates and polymethacrylates, polyacrylonitriles, polyacrylamides and polymethyl methacrylates impact-modified with butyl acrylate.

10. Copolymers of the monomers mentioned under 9) with each other or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallylmelamine; and also their copolymers with olefins mentioned in section 1.

12. Homopolymers and copolymers of cyclic ethers, such as polyalkylene glycols, polyethylene oxide, polypropylene oxide or copolymers thereof with bisglycidyl ethers.

13. Polyacetals; such as polyoxymethylene and those polyoxymethylenes which contain comonomers, for example ethylene oxide; polyacetals modified with thermoplastic polyurethanes, acrylates or MBS.

14. Polyphenylene oxides and sulphides, and mixtures thereof with styrene polymers or polyamides.

15. Polyurethanes derived from hydroxyl-terminated polyethers, polyesters and polybutadienes on the one hand and aliphatic or aromatic polyisocyanates on the other, and also precursors thereof.

16. Polyamides and copolyamides derived from diamines and dicarboxylic acids and/or from aminocarboxylic acids or the corresponding lactams, such as polyamide 4, 6, 6/6, 6/10, 6/9, 6/12, 4/6, 12/12, 11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide, block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. Additionally, polyamides or copolyamides modified with EPDM or ABS; and polyamides condensed during processing (RIM polyamide systems).

17. Polyureas, polyimides, polyamide-imides and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and also block polyether esters derived from hydroxyl-terminated polyethers; and also polyesters modified with polycarbonates or MBS.

19. Polycarbonates and polyester carbonates.

20. Polysulphones, polyether sulphones and polyether ketones.
21. Crosslinked polymers derived from aldehydes on the one hand and phenols, urea or melamine on the other hand, such as phenol/formaldehyde resins, urea/formaldehyde resins and melamine/formaldehyde resins.
22. Drying and nondrying alkyd resins.
23. Unsaturated polyester resins derived from copolyesters of saturated and unsaturated dicarboxylic acids with polyhydric alcohols and vinyl compounds as cross-linking agents, and also halogen-containing modifications thereof of low flammability.
24. Crosslinkable acrylic resins derived from substituted acrylates, for example from epoxy acrylates, urethane acrylates or polyester acrylates.
25. Alkyd resins, polyester resins and acrylic resins crosslinked with melamine resins, urea resins, polyisocyanates or epoxy resins.
26. Crosslinked epoxy resins derived from polyepoxides, e.g. from bisglycidyl ethers or from cycloaliphatic diepoxides.
27. Natural polymers, such as cellulose, natural rubber, gelatin and derivatives thereof which have been chemically modified in a polymer-homologous manner, such as cellulose acetates, cellulose propionates and cellulose butyrates, or the cellulose ethers, such as methylcellulose; and also rosins and derivatives.
28. Mixtures (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/BT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.
29. Natural and synthetic organic substances which constitute pure monomeric compounds or mixtures thereof, examples being mineral oils, animal or vegetable fats, oils and waxes, or oils, waxes and fats based on synthetic esters (e.g. phthalates, adipates, phosphates or trimellitates), and also blends of synthetic esters with mineral oils in any desired proportion by weight, as are employed, for example, as spin finishes, and aqueous emulsions thereof.
30. Aqueous emulsions of natural or synthetic rubbers, such as natural rubber latex or latices of carboxylated styrene-butadiene copolymers.

These polymers may include further additives, such as, for example

1. Antioxidants
1.1 Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butyl-phenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadecyl)phenol, 2,4-dimethyl-6-(1'-methyltridecyl)phenol and mixtures thereof.
1.2 Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.
1.3 Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.
1.4 Tocopherols, such as, α-tocopherol, β-tocopherol, γ-tocopherol, δ-tocopherol and mixtures thereof (vitamin E).
1.5 Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulphide.
1.6 Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidene-bis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)-dicyclopentadiene, bis[2-(3'-tert-butyl-2'-hydroxy-5'-methylbenzyl)-6-tert-butyl-4-methyl-phenyl] terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.
1.7 O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulphide, isooctyl 3,5-di-tert-butyl-4-hydroxybenzylmercaptoacetate.
1.8 Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4-(1,1,3,3-tetramethylbutyl)phenyl], 2,2-bis(3,5-di-tert-butyl-4-hydroxybenzyl)malonate.
1.9 Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)-phenol.
1.10 Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tertbutyl-4-hydroxy-phenylpropionyl)hexahydro-1,3,5-triazine, 1,3,5-tris(3,5-dicyclohexyl-4-hydroxybenzyl) isocyanurate.

1.11 Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the Ca salt of the monoethyl ester of 3,5-di-tert-butyl-4-hydroxybenzylphosphonic acid.

1.12 Acylaminophenols, 4-hydroxylauramide, 4-hydroxystearanilide, octyl N-(3,5-di-tert-butyl-4-hydroxyphenyl) carbamate.

1.13 Esters of β-(3,5-di-tert-butyl-4-hydroxyphenyl)propionic acid with mono- or poly-hydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14 Esters of β-(5-tert-butyl-4-hydroxy-3-methylphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15 Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16 Esters of 3,5-di-tert-butyl-4-hydroxyphenylacetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17 Amides of β-(3,5-di-tert-butyl-4-hydroxyphenyl)propionic acid, e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

2. UV absorbers and light stabilizers 2.1 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-[2'-hydroxy-5'-(1,1,3,3-tetramethyl-butyl)phenyl]benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]benzotriazole with polyethylene glycol 300; [R—CH$_2$CH$_2$—COO (CH$_2$)$_3$]$_2$— where R=3'-tert-butyl-4'-hydroxy-5'-2H-benzotriazol-2-ylphenyl.

2.2 2-Hydroxybenzophenones, for example the 4-hydroxy, 4-methoxy, 4-octoxy, 4-decyloxy, 4-dodecyloxy, 4-benzyloxy, 4,2',4-trihydroxy and 2'-hydroxy-4,4'-dimethoxy derivative.

2.3 Esters of substituted or unsubstituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4 Acrylates, for example ethyl or isooctyl α-cyano-β,β-diphenylacrylate, methyl α-carbomethoxycinnamate, methyl or butyl α-cyano-β-methyl-p-methoxycinnamate, methyl α-carbomethoxy-p-methoxycinnamate, N-(β-carbomethoxy-β-cyanovinyl)-2-methylindoline.

2.5 Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-tert-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.6 Sterically hindered amines, for example bis(2,2,6,6-tetramethylpiperidyl) sebacate, bis(2,2,6,6-tetramethylpiperidyl) succinate, bis(1,2,2,6,6-pentamethylpiperidyl) sebacate, n-butyl-3,5-di-tert-butyl-4-hydroxybenzylmalonic acid bis(1,2,2,6,6-pentamethylpiperidyl) ester, the condensate of 1-hydroxyethyl-2,2,6,6-tetramethyl-4-hydroxypiperidine and succinic acid, the condensate of N,N'-bis-(2,2,6,6-tetramethyl-4-piperidyl)hexamethylendiamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl) 2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensate of N,N'-bis(2,2,6,6-tetramethyl-4-piperidyl)hexamethylenediamine and 4-morpholino-2,6-dichloro-1,3,5-triazine, the condensate of 2-chloro-4,6-di-(4-n-butylamino-2,2,6,6-tetramethylpiperidyl)-1,3,5-triazine and 1,2-bis(3-amino-propylamino)ethane, the condensate of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione.

2.7 Oxalamides, for example 4,4'-dioctyloxyoxanilide, 2,2'-diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy-disubstituted and of o- and p-ethoxy-disubstituted oxanilides.

2.8 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxy-propyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine.

3. Metal deactivators, for example N,N'-diphenyloxalamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bisisodecyloxy pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyl-dibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite.

5. Peroxide scavengers, examples being esters of β-thiodipropionic acid, for example the lauryl, stearyl, myristyl or tridecyl ester, mercaptobenzimidazole, the zinc salt of 2-mercaptobenzimidazole, zinc dibutyldithiocarbamate, dioctadecyl disulphide, pentaerythritol tetrakis(β-dodecylmercapto)propionate.

6. Polyamide stabilizers, examples being copper salts in combination with iodides and/or phosphorus compounds and salts of divalent manganese.

7. Basic costabilizers, examples being melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example Ca stearate, Zn stearate, Mg behenate, Mg stearate, Na ricinoleate, K palmitate, antimony pyrocatecholate or tin pyrocatecholate.

8. Nucleating agents, examples being 4-tert-butylbenzoic acid, adipic acid, diphenylacetic acid.

9. Fillers and reinforcing agents, examples being calcium carbonate, silicates, glass fibres, asbestos, talc, kaolin, mica, barium sulphate, metal oxides and metal hydroxides, carbon black, graphite.

10. Other additives, examples being plasticizers, lubricants, emulsifiers, pigments, optical brighteners, flame retardants, antistatics, blowing agents.

These additional additives can be added before, together with or after the addition of the micropowders of the invention to the polymers. The addition both of these additives and of the micropowders of the invention can take place in the form of solids, in solution or as a melt, and also in the form of solid or liquid mixtures or masterbatches/concentrates.

The specific embodiment of the invention is to be shown by means of the following examples, which, however, are not intended to restrict its applicability to similar areas.

EXAMPLES

Example 1

Laboratory Apparatus

1. MC 100 from Micro-Macinazione
2. AFG 100 from Hosokawa Alpine
Throughput about 1 kg/hour Production Unit:
AFG 710-4 from Hosokawa Alpine
Throughput: 40 kg/hour Laboratory Preparation Instructions:
The micronized product is prepared on the MC 100 mill from Micro-Macinazione S.A. The starting product is supplied to the mill by way of a vibratory chute such that in the end effect the incoming flow of coarse powder corresponds to the outgoing passage of ultrafine powder. The air pressure for operating the mill is set at 7 bar, and then metered addition is commenced. The mill employed possesses a static classifier for separating off the fine fraction, and so further adjustments are not possible. With a throughput of approximately 1 kg per hour the following result was obtained:

Product 1:
Starting product: $D_{50}$: 53 µm, $D_{90}$: 102 µm
End product: $D_{50}$: 3.4 µm, $D_{90}$: 5.8 µm Product 2:
Starting product: 12.4%<63 µm, 95.8%<500 µm
End product: $D_{50}$: 3.5 µm, $D_{90}$: 8.6 µm Product 3:
  Starting product: $D_{50}$=57 μm
  End product: $D_{50}$: 4.5 μm
Product 1: 2,2,4,4-Tetramethyl-7-oxa-3,20-diazadispiro[5.1.11.2]heneicosan-21-one
Product 2: Polymer of 2,2,4,4-tetramethyl-7-oxa-3,20-diazadispiro[5.1.11.2]heneicosan-21-one and epichlorohydrin
Product 3: Pentaerythrityl tetrakis(3-(3,5-di-tert-butyl-4-hydroxyphenyl)propionate)

In the use examples which follow the following raw materials are used:
Coarse powder: Hostavin N 30 (=Product 2) powder: 30%<30 μm, 100%<500 μm
Micropowder: Hostavin N 30 (=Product 2): d50=9 μm (i.e. 50% smaller/50% larger), 100%<50 μm Use in PP with Compounder Example 2

100 parts of PP powder (MFR 230/2.16=1.2 g/10 min) were mixed with 0.2 phr of Hostavin N 30 powder or with the same amount of micropowder. The powder was kneaded in a laboratory compounder at 200° C. and 40 rpm for 10 min. The kneaded powder was then used to produce 100 μm films on the laboratory press at 190° C., which were illuminated in a Weatherometer (Ci4000). The degradation of the polymer was monitored by means of the increase in the CO number. The longer the time taken to reach a defined CO number, the better the stabilization.

Result: After an illumination time of 620 hours the CO number is 1.5 in the case of the polymer with coarse powder and 0.0 in the case of the polymer with micropowder.

The experiment clearly shows the improved efficacy associated with use of a micropowder.

Use in PP without Compounder

Example 3

The procedure is as in Example 2 but without incorporation in the compounder. The 100 μm film is produced directly from the powder mixture on the press. The film obtained is cut into sections a further two times and again pressed to a film. The experiment with the micronized powder was repeated once.

Table 2: Time taken to reach Δ CO=0.5
  With coarse powder: 300 h
  With micropowder: 2858 h
  Repetition with micropowder: 2734 h The experiment again shows the improved efficiency associated with use of the micropowder.

Use in PE without Compounder

Example 4

The experiments were carried out as in Ex. 3, but using an LDPE powder (MFR=1.8 g/10 min) instead of PP.
  Table 3: Time taken to reach Δ CO=0.5
With coarse powder: 1720 h
With micropowder: 2120 h
Repetition with micropowder: 2190 h

The invention claimed is:

1. A method of uniformly distributing a substance or mixture of substances in the form of a micropowder in a carrier or substrate or in a mixture of different carriers or substrates, wherein the substance or mixture of substances in the form of a micropowder is component A, wherein component A has a particle size <50 μm, wherein the carrier or substrate or the mixture of different carriers or substrates is component B, wherein component B has a particle size <5 mm and wherein component A has a particle size distribution $D_{90}$<50 μm and $D_{50}$<20 μm, comprising the steps of uniformly applying component A to the surface of component B and subjecting the mixture of components A and B to a shape conversion operation wherein component A is dissolved in component B with at least one of pressure and temperature, and wherein the viscosity during the method is at least 50 mPas*s.

2. The method according to claim 1, wherein the size ratio of the component A to component B is <1:20.

3. The method according to claim 1, wherein component A has a particle size <10 μm.

4. The method according to claim 1, wherein component A has a particle size distribution $D_{90}$<30 μm and $D_{50}$<10 μm.

5. The method according to claim 1, wherein component B has a particle size <1 mm.

6. The method according to claim 1, wherein the viscosity of the mixture of components A and B is at least 500 mPas*s.

7. The method according to claim 1, wherein component A is at least one plastics additive.

8. The method according to claim 7, wherein the at least one plastics additive is one from the class of the HALS.

9. The method according to claim 7, wherein the at least one plastics additive is produced by grinding a coarser form or by direct production by means of crystallization or by spraying.

10. The method according to claim 9, wherein the at least one plastic additive is converted from a coarse powder to a micropowder by means of air jet mill.

11. The method according to claim 1, wherein component B is at least one polymeric substrate.

12. The method according to claim 11, wherein the at least one polymeric substrate is a polyolefin.

13. The method according to claim 1, wherein the size ratio of the component A to component B is <1:50.

14. The method according to claim 1, wherein the size ratio of the component A to component B is <1:100.

* * * * *